Sept. 8, 1931.  S. M. FAIRCHILD  1,822,650
METHOD OF MAPPING
Filed April 26, 1927
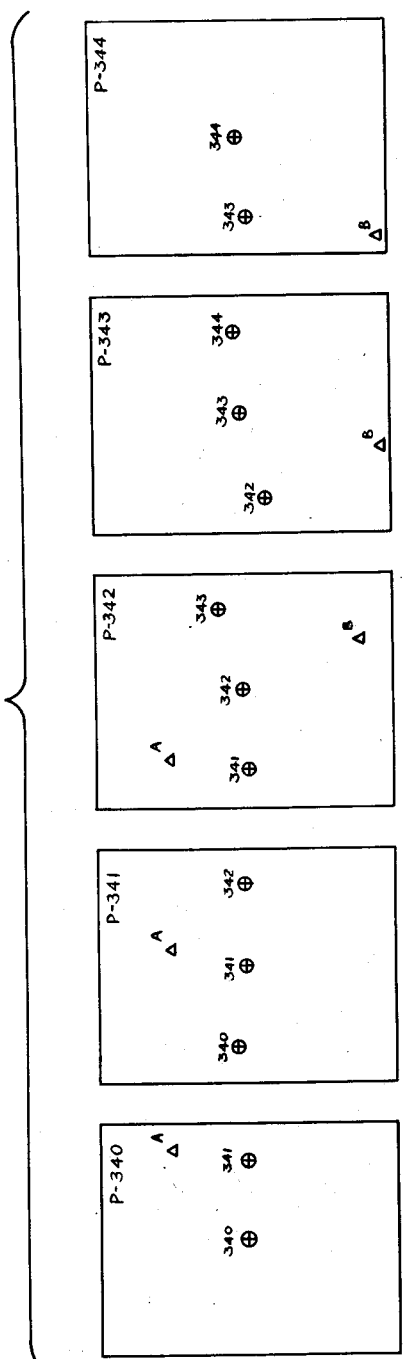
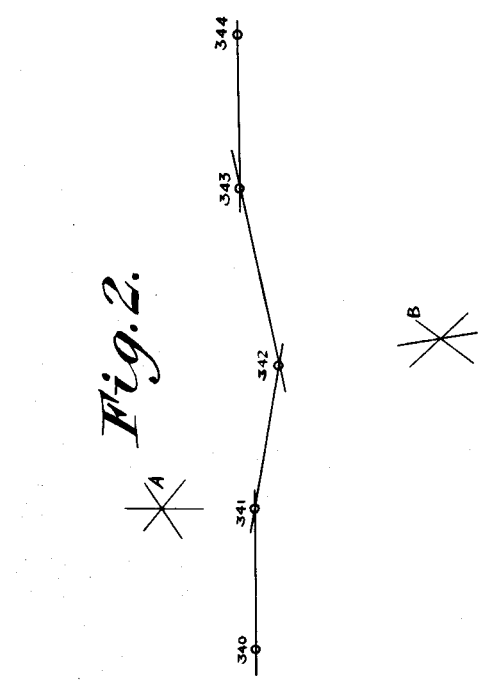
Inventor
Sherman M. Fairchild.
By Attorney
B. H. Carpenter.

Patented Sept. 8, 1931

1,822,650

UNITED STATES PATENT OFFICE

SHERMAN MILLS FAIRCHILD, OF NEW YORK, N. Y.

METHOD OF MAPPING

Application filed April 26, 1927. Serial No. 186,706.

The main object of this invention is to provide an improved method of constructing a photographic map from overlapping aerial photographs.

Other objects will become apparent as the description proceeds.

Referring to the drawings.

Fig. 1 illustrates diagrammatically a series of overlapping aerial photographs showing the respective centers of each photograph and also control and reference points.

Fig. 2 illustrates a traverse of the center points of the photographs of Fig. 1.

Fig. 3 is an enlarged diagrammatic view of one of the photographs showing the center-to-center lines scratched thereon.

The first step in making an aerial photographic map is the securing and plotting on board of adequate control which may consist of road intersections, railroad crossings and other easily identified points.

For securing correct alignment of a strip of prints between two control points, secondary control known as a center line traverse is used, any angle of which is formed by two lines joining the center of a print with the photographic images corresponding to the centers of the adjacent prints, the angles formed by the lines joining centers being traced or otherwise transferred from the print, and the distances between them determined by a series of computations described below.

To traverse a given strip, an overlap of at least 50% in the direction of flight should for ease in plotting, be required, so each print may have marked upon its surface, its own center and the images of the centers of the adjacent prints.

In the drawings I have illustrated the aerial photographs diagrammatically for the sake of clearness. I have designated the photographs respectively P—340; P—341; P—342; P—343; P—344. The respective centers I have indicated by a cross and designated respectively as 340, 341, 342, 343, 344.

The photographs are taken with more than fifty percent overlap and therefore an object which is at the center of a given photograph will also appear on each of the adjacent photographs of the series.

In carrying out my method, the center of each photograph is located in any desired manner as by photographing a cross at the center point at the same time that the exposure is made. The center of each photograph is then located by inspection on the adjacent photographs, that is by locating the same point or object as at the center, and is marked by a prick mark. In actual practice a circle is usually drawn around the centers and also around the pricked location thereof on the adjacent photograph. Each circle is designated by the center contained therein.

The next step is to scratch on each photograph a straight line thru the center of the photograph and the point on the photograph which corresponds to the center of one of the adjacent photographs. A straight line is then scratched thru the center of the photograph and the point corresponding to the center of the other adjacent photograph. These lines will hereinafter be referred to as center-to-center lines.

The two lines on each photograph intersect at the center of the photograph and the angle between these lines is the change in direction between the center to center lines of the adjacent photographs.

The plane in flying a strip sometimes does not maintain a constant altitude, resulting in a varying scale of the contact prints of aerial negatives. This condition is corrected by reducing the scale of all the prints to the scale of any one, generally the first, print P—340, commonly called the base print.

The distance from center to center of the photographs is obtained as follows: The print to print ratio is obtained in any suitable manner and from this ratio the enlargement or reduction factor to bring all photographs to the desired base print or control scale is calculated.

The center to center distances are now measured on each photograph and corrected to the base or control scale by multiplying by the respective enlargement or reduction factor of the photograph upon which each is measured.

It is evident, since the photographs are taken with an overlap of more than fifty percent, the center to center distance of any two photographs will appear on each of said photographs. We therefore will have two measurements for any given center to center distance. After correcting each of these measurements as described above, the mean or average is taken and tabulated for future use as the center to center distance of the two photographs.

This method of obtaining the center to center distance between photographs results in an accurate determination of the distance far within all ordinary requirements.

The center line traverse is now plotted on tracing paper, cloth or other suitable material. To accomplish this, the center to center lines of the first three photographs are traced from the photograph P—341. The point of intersection of these center to center lines is the center 341 of the photograph P—341, as computed, is laid off on the respective center line, thus locating the center 340 of photograph P—340. The center 342 of photograph P—342 is located in a similar manner.

Having transferred all the centers, fine lines are drawn through them; as on print P—341, lines are drawn from center 341 through 342 and from 341 through 340. Points in the general vicinity of the perpendicular bisector of the line joining the centers of consecutive prints are chosen because the image displacement due to relief negligibly effect the distances between these points which are known as the "print to print distance."

On P—340 points "a" and "b" are taken; the same points are also marked on P—341. This operation is followed throughout the set of prints; the print to print distance between points measured in inches and marked on the prints, also entered on the computation sheet.

The following table of computations, including figures actually used in connection with certain computations, will be hereinafter more fully discussed, and will form a reference for such discussion:

| 1 | 2 | 3 | 4 | 5 | 6 |
|---|---|---|---|---|---|
| Print | Print to print distances | | Print to print ratio | Print to base print ratio | Final corrected ratio |
| 340 | | 6.45 | | 2.00 | 1.980 |
| 341 | 6.41 | 4.83 | 1.006 | 2.012 | 1.991 |
| 342 | 4.80 | 5.04 | 1.006 | 2.024 | 2.003 |
| 343 | 5.02 | 5.19 | 1.003 | 2.030 | 2.010 |
| 344 | 5.17 | | 1.003 | 2.036 | 2.016 |

| | 7 | 8 | 9 | 10 | 11 | 12 |
|---|---|---|---|---|---|---|
| Print | Back sight | Fore sight | Enlarged back fore sight | | Mean distance | Corrected mean distance |
| 340 | | 3.02 | | 6.04 | 6.05 | 5.99 |
| 341 | 3.01 | 3.12 | 6.06 | 6.28 | 6.295 | 6.23 |
| 342 | 3.12 | 2.53 | 6.31 | 5.12 | 5.125 | 5.07 |
| 343 | 2.53 | 2.60 | 5.13 | 5.28 | 5.205 | 5.21 |
| 344 | 2.58 | | 5.25 | | | |

Under column (3) opposite print P—340 is entered the print to print distance 6.45"; the distance 6.41" between the same points on P—341 as entered under column (2) opposite print P—341. The print to print distance on P—341 in the overlap between P—341 and P—342 is entered in column (3) opposite print number P—341. In the same manner all print to print distances on all prints are entered in these columns. A ratio known as "print to print ratio" (column 4) of P—341 to P—340 is then obtained by dividing the distance A—B on P—340 by the distance A—B on P—341 as $$\frac{645}{641} = 1.006.$$

This is the ratio of enlargement, or reduction as the case may be to fit the scale of the previous print. In this strip all the print to print ratios are of enlargements. By this method the print to print ratios of all the prints are obtained.

Contact prints P—340 to P—344 were flown at a scale of approximately 1"=800', the scale of mosaic is to be 1"=400', which requires enlargements to approximately 2.00 diameter.

Print P—340 being the base print is given the base ratio of 2.00, by multiplying this base ratio by the print to print ratio of the following print (P—341), the ratio of P—341 to the base ratio is determined. The base ratio of P—342 is found by multiplying P—341 base ratio by P—342 print ratio, etc.

Having brought all the prints to the scale of our base print, the distances between centers are measured in inches and marked on the prints and also entered in the proper columns. Distance between 341 and 340 centers on P—340 print measures 3.02 and is called the foresight and on P—341 the distance between these same centers 3.01″ and known as the backsight.

P—340 being the first print of the strip has only two centers, that of 340 and 341. This foresight distance of 3.02″ is entered in column 8; the backsight distance of 3.01″ between the same centers on P—341 is entered in column 7. The foresight distance of 3.12″ on P—341 is entered on column 8, continuing until all the backsights and foresights are entered on the computation sheet. Every print has a backsight and foresight excepting the base print which has a foresight, and the last print, which has only a backsight. These backsight and foresight distances of each print are multiplied by its "print to base print ratio", and the new distance marked under columns 9 and 10 3.01″ and 3.12″ on print P—341 × base ratio 2.012 = 6.06 and 6.28. Where the B. S. and F. S. distances between two centers vary slightly a mean distance is taken.

The next step is to draw the preliminary traverse which is made by fastening P—340 print on the illuminated tracing glass; place a sheet of tracing paper over it and with a needle point pierce the paper over P—340 center circling and numbering it as center 340, then trace the line which join 340 and 341 centers.

From our computation sheet, column 11, the mean distance between 340 and 341 is noted and measured from center 340 along the line traced on paper; for instance, the plotted center of P—341 is 6.05″ on the line from 340.

Replace P—340 by P—341 print. Place tracing over print so the plotted center of P—341 is directly over center of print P—341 and the traced line between 341 and 340 centers is directly on the line joining the same centers on the contact print. Draw a line on the tracing from 341 center through A, intersecting the plotted line from 340. The line between centers 341 and 342 is now traced, the computed distance (6.295″) between 341 and 342 centers is noted from column 11 and is measured along this line from 341, resulting in the center of 342 being plotted. This procedure is followed throughout the strip until all the centers and control points are plotted on the tracing.

Various changes in the construction of the embodiment illustrated in the drawings may be made without departing from the spirit of the invention, and I do not therefore desire to limit myself to the specific construction shown and described, but to interpret the invention broadly within the scope of the appended claims.

What I claim as my invention is:

1. The method of constructing an aerial map from a series of overlapping aerial photographs consisting of locating the center of each photograph, locating the point corresponding to each center on each adjacent photograph, drawing a center to center line thru the center of each photograph and thru each located center on the photograph, measuring the distance from the center of each photograph to the point on the photograph corresponding to the center of each adjacent photograph, reducing said measurements to a common scale, plotting a traverse of the center lines of the photographs from the said measurements and from the angle between the center to center lines as shown on the photographs, bringing the photographs to the common scale of the traverse and forming a composite map by orienting and locating said scale photographs according to the plotted traverse.

2. The method of forming a photographic map from a series of overlapping aerial photographs in which the point corresponding to the center of each photograph appears on at least two other photographs of the series, including the step of forming a traverse of the centers of a plurality of photographs of the series, bringing the photographs of the said plurality to the scale of the traverse and forming a composite map by locating, orienting and securing said scale photographs according to the traverse.

3. The method of constructing an aerial map from a series of aerial photographs having an overlap of more than fifty percent and each of said photographs having a center point photographed thereon during the taking of the photograph, said method consisting in locating, by inspection of the photographically represented terrain, the points corresponding to the center of each adjacent photograph, drawing a line joining the center of each photograph with the points located thereon coinciding with the center of each adjacent photograph, measuring the lines thus drawn, measuring the angles formed by these lines, photographically reducing or enlarging said photographs in accordance with the variance of the corresponding ones of said distance measurements to bring said photographs to a common scale with one of said photographs selected as a guide, plotting a traverse of the center lines of the photographs from the corrected distance measurements and from the angle between the center to center lines as shown on the photographs, bringing the photographs to the scale of the complete traverse and forming a composite mosaic map by orienting and locating said scale photographs in accordance with the plotted traverse of the entire series of photographs.

In testimony whereof I affix my signature.

SHERMAN MILLS FAIRCHILD.